(12) United States Patent
Otsuka et al.

(10) Patent No.: US 7,328,127 B2
(45) Date of Patent: Feb. 5, 2008

(54) COMPUTER-READABLE RECORDING MEDIUM RECORDING SYSTEM PERFORMANCE MONITORING PROGRAM, AND SYSTEM PERFORMANCE MONITORING METHOD AND APPARATUS

(75) Inventors: Hiroshi Otsuka, Kawasaki (JP); Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 11/268,042

(22) Filed: Nov. 7, 2005

(65) Prior Publication Data
US 2007/0022327 A1 Jan. 25, 2007

(30) Foreign Application Priority Data
Jul. 20, 2005 (JP) ............................... 2005-210256

(51) Int. Cl.
G06F 11/00 (2006.01)
(52) U.S. Cl. .................... 702/182; 709/224; 714/47
(58) Field of Classification Search ................ 702/181, 702/182; 717/107, 108; 709/220–224, 203; 714/47
See application file for complete search history.

(56) References Cited
U.S. PATENT DOCUMENTS 5,715,373 A * 2/1998 Desgrousilliers et al. ..... 706/47
5,913,028 A * 6/1999 Wang et al. ................. 709/203
6,041,347 A * 3/2000 Harsham et al. ............ 709/220
6,226,788 B1 * 5/2001 Schoening et al. ......... 717/107

FOREIGN PATENT DOCUMENTS

| JP | 2001-077815 | 3/2001 |
|---|---|---|
| JP | 2004-185909 | 7/2004 |
| JP | 2004-302547 | 10/2004 |

* cited by examiner

Primary Examiner—John Barlow
Assistant Examiner—Hien Vo
(74) Attorney, Agent, or Firm—Greer, Burns & Crain, Ltd

(57) ABSTRACT

A computer-readable recording medium recording a system performance monitoring program for monitoring performance at desired timing and under desired conditions. A monitoring unit collects and stores status information indicating the operating statuses of servers in a status information memory. When other status information is necessary for evaluating performance, the monitoring unit instructs an access unit to make an appropriate access. The access from the access unit produces desired conditions and the missing status information is created. The monitoring unit collects and stores the created status information in the status information memory. When necessary status information is all stored in the status information memory, the evaluation unit reads the necessary status information to check whether the performance meets a prescribed performance criterion.

12 Claims, 15 Drawing Sheets

FIG. 9

301 ACCESS INFORMATION

| START TIME | URL | RESPONSE TIME | REQUEST DATA SIZE | RESPONSE DATA SIZE |
|---|---|---|---|---|
| 00:00:00.621839 | login.jsp | 72ms | 500bytes | 1000bytes |
| 00:00:00.748814 | memu.jsp | 138ms | 500bytes | 5000bytes |
| 00:00:03.507394 | index.htm | 3ms | 100bytes | 500bytes |
| 00:00:03.625377 | news.jsp | 127ms | 500bytes | 3000bytes |
| 00:00:05.507394 | index.htm | 2ms | 100bytes | 500bytes |
| 00:00:05.625377 | news.jsp | 127ms | 500bytes | 3000bytes |
| 00:00:05.980330 | memu.jsp | 135ms | 500bytes | 5000bytes |
| 00:00:06.140300 | index.htm | 2ms | 100bytes | 500bytes |
| 00:00:06.275278 | index.htm | 2ms | 100bytes | 500bytes |

302 CPU UTILIZATION INFORMATION

| PASSAGE TIME | AVERAGE CPU UTILIZATION | THE NUMBER OF REQUESTS | index.html | menu.jsp | login.jsp | news.jsp |
|---|---|---|---|---|---|---|
| 00:00:00 | 1% | 50 | 10 | 20 | 10 | 10 |
| 00:01:00 | 1% | 40 | 10 | 20 | 5 | 5 |
| 00:02:00 | 1% | 80 | 20 | 30 | 15 | 15 |
| 00:03:00 | 2% | 160 | 40 | 60 | 30 | 30 |
| 00:04:00 | 2% | 350 | 100 | 150 | 50 | 50 |
| 00:05:00 | 8% | 1060 | 340 | 520 | 100 | 100 |
| 00:06:00 | 15% | 2230 | 530 | 1000 | 350 | 350 |

FIG. 10

303 RESPONSE INFORMATION

| URL | SIMUL-TANEITY | THE NUMBER OF MONITORING TIMES | LAST MONITORING TIME | START TIME | RE-SPONSE TIME | DATA SIZE | |
|---|---|---|---|---|---|---|---|
| | | | | | | REQUEST | RESPONSE |
| login.jsp | 1 | 1 | 00:00:00.621839 | 00:00:00.621839 | 72ms | 500bytes | 1000bytes |
| menu.jsp | 1 | 2 | 00:00:05.980330 | 00:00:00.748814 | 138ms | 500bytes | 5000bytes |
| | | | | 00:00:05.980330 | 135ms | 500bytes | 5000bytes |
| index.html | 1 | 4 | 00:00:06.275278 | 00:00:03.507394 | 3ms | 100bytes | 500bytes |
| | | | | 00:00:05.507394 | 2ms | 100bytes | 500bytes |
| | | | | 00:00:06.140300 | 2ms | 100bytes | 500bytes |
| | | | | 00:00:06.275278 | 2ms | 100bytes | 500bytes |
| news.jsp | 1 | 2 | 00:00:05.625377 | 00:00:03.625377 | 127ms | 500bytes | 3000bytes |
| | | | | 00:00:05.625377 | 127ms | 500bytes | 3000bytes |

FIG. 11

COMPUTER-READABLE RECORDING MEDIUM RECORDING SYSTEM PERFORMANCE MONITORING PROGRAM, AND SYSTEM PERFORMANCE MONITORING METHOD AND APPARATUS

CROSS-REFERENCE TO RELATED APPLICATIONS

This application is based upon and claims the benefits of priority from the prior Japanese Patent Application No. 2005-210256, filed on Jul. 20, 2005, the entire contents of which are incorporated herein by reference.

BACKGROUND OF THE INVENTION (1) Field of the Invention

This invention relates to a computer-readable recording medium recording a system performance monitoring program, and a system performance monitoring method and apparatus. More particularly, this invention relates to a computer-readable recording medium recording a system performance monitoring program for monitoring performance of a server system comprising a plurality of servers connected to each other over a network to provide prescribed services, and a system performance monitoring method and apparatus.

(2) Description of the Related Art

Many contracts for outsourcing services using a server system include service level agreement, such as response time from a client's request to a server system's response. Therefore, monitoring of system performance is required for checking whether the agreed service level is maintained.

FIG. 15 shows an example of a typical system performance monitoring apparatus.

In this server system, a user side 940 comprising a plurality of clients 941 accesses a system side 930 comprising a plurality of servers 931, 932, and 933 to use prescribed services. In related art, to monitor the performance of the server system, an internal monitoring apparatus 901 or an external system performance monitoring apparatus 902 which monitors the performance inside or outside of the system 930 is provided. Both apparatuses may be provided.

The internal monitoring apparatus 901 is installed as a part of the system 930 to internally measure response time with a monitoring agent. In the external system performance monitoring apparatus 902, a monitoring client 912 accesses a contracted service periodically and checks whether a time required for a response is not over agreed response time.

By the way, the server system increases throughput, or the number of simultaneous processes as the number of accesses increases. Therefore, access concentration may deteriorate response processing and processing speed may slow to an impractical level. In view of this situation, a system has been proposed, which previously obtains a correlation between simultaneity of processes and response time, and evaluates the operating status of the server system by monitoring simultaneity of processes of the server system as a system parameter (for example, refer to paragraphs [0046]-[0077] and FIG. 3 of Japanese Unexamined Patent Publication No. 2004-302547).

Such an existing system performance monitoring technique using the external system performance monitoring apparatus 902 has a drawback in which the operating status is not detected unless the apparatus 902 accesses the system. For example, although response time varies depending on situation such as peak hours or off hours, the external system performance monitoring apparatus 902 accesses the system, irrespective of the situation, so that the apparatus 902 cannot evaluate the system performance with taking the situation into consideration. In addition, the apparatus 902 cannot find the cause of a low service level, such as a long response time, if detected, and also cannot predict future performance. Specifically, recent large-scale systems do not allow an administrator to easily specify the cause of a problem.

On the other hand, the internal monitoring apparatus 901 internally provided in the system 930 passively monitors the system. To measure response time of a specified service, this apparatus 901 waits an access to be made for the service. Further, to evaluate performance of the system under a desired simultaneity condition, the apparatus 901 waits until the system gets into the desired condition. Therefore, the system cannot be monitored at desired timing and under desired conditions.

There is another drawback in which a user-view response time, that is, a time from client's issuance of a request to client's reception of a response cannot be measured.

As described above, in related art, detailed monitoring with taking the situation of the system into consideration may be difficult, such as monitoring of processing time of a Central Processing Unit (CPU) or response time that is required for a desired service at desired timing and under desired conditions.

SUMMARY OF THE INVENTION

This invention has been made in view of foregoing and intends to provide a computer-readable recording medium recording a system performance monitoring program for monitoring performance of a server system at desired timing and under desired conditions, and a system performance monitoring method and apparatus. In addition, this invention intends to provide a computer-readable recording medium recording a system performance monitoring program for analyzing status information and predicting a service level at peak hours, and a system performance monitoring method and apparatus.

To accomplish the above object, the present invention provides a computer-readable recording medium recording a system performance monitoring program for monitoring performance of a server system having a plurality of servers connected to each other over a network to provide prescribed services. This program causes a computer to function as: a monitoring unit for acquiring and storing status information indicating an operating status of the server system in a status information memory, and when other status information is necessary for performance evaluation, issuing an access instruction to make an appropriate access for producing monitoring conditions for creating the other status information in the server system, and acquiring and storing the other status information created by means of the appropriate access in the status information memory; an access unit for receiving the access instruction from the monitoring unit and making the appropriate access to the server system over the network in order to produce the monitoring conditions in the server system; and an evaluation unit for analyzing the status information and the other status information being stored in the status information memory to measure performance and evaluating whether the server system meets a prescribed performance criterion.

To accomplish the above object, the present invention provides a system performance monitoring method for monitoring performance of a server system having a plurality of servers connected to each other over a network to provided prescribed services, wherein: a monitoring unit acquires and stores status information on an operating status of the server system in a status information memory, and when other status information is necessary for performance evaluation, issues an access instruction to make an appropriate access for producing monitoring conditions for creating the other status information in the server system; an access unit receives the access instruction from the monitoring unit and makes the appropriate access to the server system over the network in order to produce the monitoring conditions in the server system; the monitoring unit acquires and stores the other status information created by means of the appropriate access, in the status information memory; and an evaluation unit analyzes the status information and the other status information being stored in the status information memory to measure performance and evaluating whether the server system meets a prescribed performance criterion.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 9 shows access information collected in the status information collection process.

FIG. 10 shows CPU utilization information collected in the status information collection process.

FIG. 11 shows response information created in a performance measurement process.

DESCRIPTION OF THE PREFERRED EMBODIMENTS

A preferred embodiment of this invention will be described with reference to the accompanying drawings.

Figure 1:
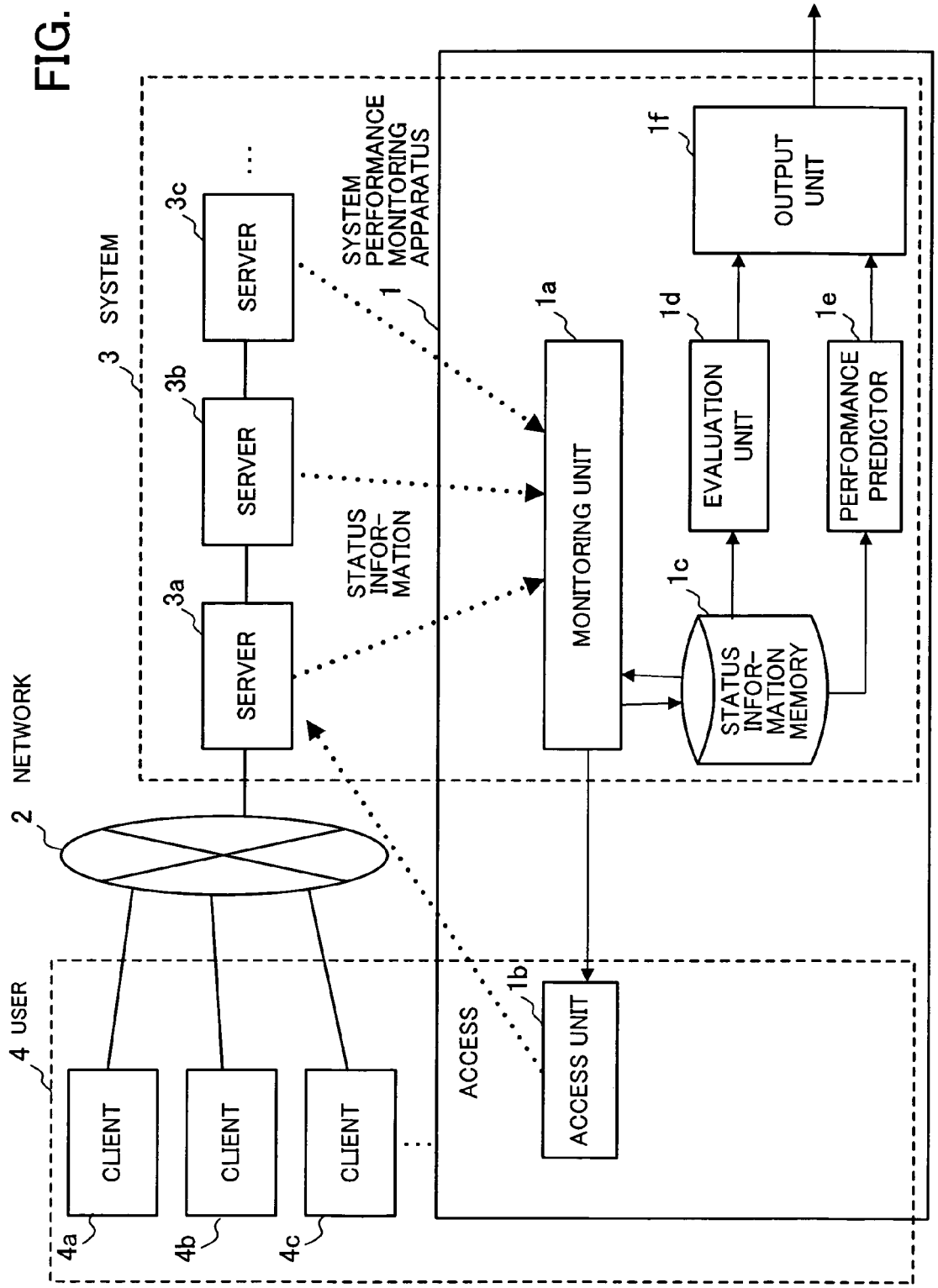
FIG. 1 is a conceptual view of this invention that is implemented in this embodiment.

FIG. 1 is a conceptual view of this invention that is implemented in this embodiment.

Servers $3a$, $3b$, $3c$, . . . of a system side 3 are connected to clients $4a$, $4b$, $4c$, . . . of a user side 4 over a network 2. The servers $3a$, $3b$, $3c$, . . . provide prescribed services in response to requests from the clients $4a$, $4b$, $4c$, . . . . The plural servers $3a$, $3b$, $3c$, . . . are connected to each other over a network (hereinafter, referred to as a local network) inside the system side 3 to provide the services in cooperation with each other. A system performance monitoring apparatus 1 is connected to the local network of the system side 3 and, when necessary, is also connected to the network 2.

The system performance monitoring apparatus 1 acquires status information indicating the operating statuses of the servers $3a$, $3b$, $3c$, . . . by connecting to the local network of the system 3 and analyzes the status information to check whether the server system meets a prescribed performance criterion. For this purpose, this system performance monitoring apparatus 1 has a monitoring unit $1a$, an access unit $1b$, a status information memory $1c$, an evaluation unit $1d$, a performance predicator $1e$, and an output unit $1f$.

In this connection, the access unit $1b$ of this system performance monitoring apparatus 1 can be externally provided on the user side 4, which will be described later.

The monitoring unit $1a$ collects status information indicating the operating statuses of the servers $3a$, $3b$, $3c$, . . . to recognize system status. For example, an agent is provided in each server $3a$, $3b$, $3c$, . . . to monitor CPU utilization, simultaneity of access, and information on each access and create status information. The monitoring unit $1a$ collects the created status information. Alternatively, the monitoring unit $1a$ acquires packet data traveling between the servers via the mirror ports of switches on the local network connecting the servers $3a$, $3b$, $3c$, . . . , and analyzes the packet data to create status information indicating a type of service (Uniform Resource Locator (URL)), the number of services, and response time. The monitoring unit $1a$ stores and manages the collected status information as a database in the status information memory $1c$. In addition, the monitoring unit $1a$ checks the status information memory $1c$ to find whether the number of the stored status information is enough to evaluate performance. If other status information is necessary and the information can be created by means of a prescribed access of the access unit $1b$, the monitoring unit $1a$ instructs the access unit $1b$ to make an appropriate access. Then the monitoring unit $1a$ collects and stores the newly created status information in the status information memory $1c$.

The access unit $1b$ receives an access instruction from the monitoring unit $1a$. The access instruction specifies an access pattern and access timing. By accessing the servers $3a$, $3b$, $3c$, . . . according to the instruction, the access unit $1b$ produces monitoring conditions for creating missing status information in the server system. If status information on a certain service is missing, the access unit $1b$ makes an access that causes the servers $3a$, $3b$, $3c$, . . . to perform this service. In this connection, not only accesses of one type or one access, some accesses can be made in a specified pattern. For using a certain service and then another service, for example, its pattern and access timing can be specified. As another example, if status information indicating an operating status of the system under a desired simultaneity condition is missing, an access instruction to produce the desired condition is created. At this time, the instruction lets the access unit $1b$ make only deficient accesses. In short, various instructions can be created to get the server system into desired conditions.

The status information memory $1c$ is a memory unit for storing status information on the monitoring target servers $3a$, $3b$, $3c$, . . . collected by the monitoring unit $1a$.

The evaluation unit $1d$ reads the status information indicating the current status from the status information memory 1c, and analyzes the information to measure performance. Then the evaluation unit 1d compares the measured performance with a preset performance criterion to see if the current service level is adequate. In a case of monitoring response time for each service, the status information is classified by services and analyzed to find the longest response time for each service. Then the evaluation unit 1d compares this longest time with limit time to evaluate performance. As described above, the evaluation unit 1d has a function to evaluate the current performance of the server system.

The performance predictor 1e creates a prediction model with specified performance as a performance parameter, based on the status information being stored in the status information memory 1c. This predictor 1e reads status information required for creating the prediction model, from the status information memory 1c. To create the predication model representing one-day movements of the performance parameter, the status information for the past one-day is read, for example. Then based on combinations of the performance parameter and a specified data item included in the status information, a function of the performance parameter and the data item is created as the prediction model. For example, to create a prediction model of response time as a performance parameter and simultaneity as a data item, combinations of the number of accesses and the longest response time required under the simultaneity condition are detected from status information and a function of the response time and the access simultaneity is created as the prediction model. Then based on the limit of the performance criterion and the created prediction model, an allowable simultaneity range for maintaining an agreed service level is determined. By comparing the current data with the allowable range, the current service level can be determined as being adequate when the current data is within the allowable range. When the current data is close to a limit of the allowable range, it can be recognized that the adequate service level may not be maintained. In short, the performance predictor 1e has a function to set information to be used for determining a possibility of lowering the current service level into an inadequate level.

The output unit 1f displays evaluation results obtained by the evaluation unit 1d and prediction results obtained by the performance predictor 1e, on an output device such as a display unit to show these results to an administrator. Alternatively, the output unit 1f can send these results to the administrator via e-mail.

In this system performance monitoring apparatus 1, the monitoring unit 1a collects status information indicating the operating statuses of the servers 3a, 3b, 3c, . . . , at prescribed intervals or when a prescribed monitoring start situation arises, and stores the status information in the status information memory 1c. At this time, the monitoring unit 1a checks whether other status information is necessary for evaluating performance. When other status information is necessary and the status information can be created by means of an access of the access unit 1b, the monitoring unit 1a instructs the access unit 1b to make the access to the servers 3a, 3b, 3c, . . . . The access from the access unit 1b gets the servers 3a, 3b, 3c, . . . into desired monitoring conditions and the required status information is created. The monitoring unit 1a collects and stores the status information in the status information memory 1c.

To determine whether the current server system has an agreed service level, the evaluation unit 1d reads the status information indicating the current system status from the status information memory 1c, and analyzes the information to measure current performance. Then, the evaluation unit 1d compares the measured performance with the limit of the performance criterion to find whether the current service level is adequate. This evaluation result is sent to the output unit 1f to notify the administrator.

In addition, to predict whether the server system can maintain an adequate service level, the performance predictor 1e analyzes the stored status information, creates a prediction model for specified performance, and calculates an allowable range for maintaining the adequate service level. For example, a function of response time and simultaneity is created as a response time prediction model and then an allowable simultaneity range for maintaining agreed response time is calculated. At this time, the allowable range of simultaneity (data item) is calculated by applying the longest limit of response time (performance parameter) to the prediction model. Based on the allowable range, it can be predicted whether an adequate service level can be maintained. By narrowing the allowable range, it can be recognized whether there is possibility of causing an inadequate service level. The output unit 1f notifies the administrator of the prediction result.

As described above, to collect necessary status information on the servers 3a, 3b, 3c, . . . composing the server system for evaluating the current performance or creating a prediction model, an access is made to produce desired monitoring conditions, and the necessary status information is acquired. This means that necessary status information can be collected by producing desired conditions at desired timing and the performance can be evaluated. In addition, by creating a prediction model based on the status information collected in this manner, a peak-hour service level can be predicted.

Now, a case where this configuration is applied for monitoring responses of a 3-tiered Web system comprising a Web server, an Application (App) server, and a database (DB) server to provide services will be described in detail with reference to the drawings. In this case, response time is compared with a limit to determine whether a service level is adequate. That is, the service level is determined as being adequate when the response time is under the limit while the service level is determined as being inadequate when the response time is over the limit.

First two arrangements of an access unit, where this unit is provided internally and externally, will be described as the configuration of the system performance monitoring apparatus according to this embodiment.

Figure 2:
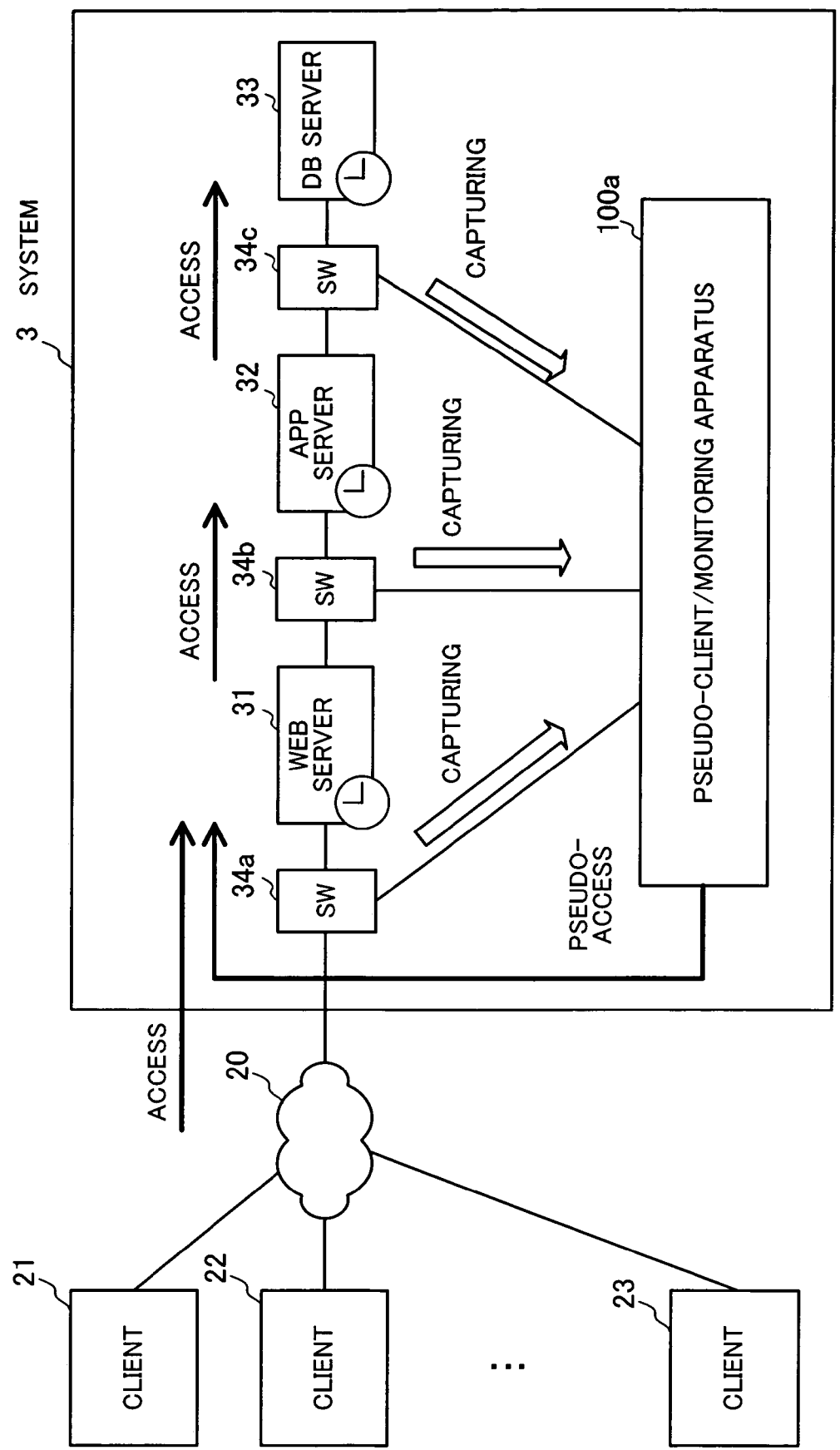
FIG. 2 shows the first configuration of a system performance monitoring apparatus.

FIG. 2 shows the first configuration of the system performance monitoring apparatus according to this embodiment, in which an access unit is internally provided.

In a system 3, a Web server 31, an App server 32, and a DB server 33 are connected to each other via switches (SW) 34a, 34b, and 34c. The Web server 31, the App server 32 and the DB server 33 provide prescribed services in response to requests from clients 21, 22, and 23 being connected over an external network 20. Each switch 34a, 34b and 34c has a mirror port for mirroring data traveling through the own switch. Mirroring is a function to make a copy of data to be output to a certain port and output the copy to another port.

As the first configuration example of the system performance monitoring apparatus according to this embodiment, a pseudo-client/monitoring apparatus 100a having an access unit is arranged inside the system 3.

The pseudo-client/monitoring apparatus 100a is connected to the switches 34a, 34b and 34c inside the system 3 and is designed to be capable of capturing information data traveling between the Web server 31, the App server 32 and the DB server 33, via the mirror ports of the switches 34a, 34b, and 34c, analyzing the captured packet data to obtain URLs, the number of services and response time, and creating status information. When other status information is necessary, the pseudo-client/monitoring apparatus 100a makes a pseudo-access by sending information data requesting a prescribed service to the Web server 31, the App server 32, and the DB server 33 via the network inside the system 3. Then the pseudo-client/monitoring apparatus 100a receives and analyzes a response packet to acquire the necessary status information.

This configuration in which the access unit is internally provided is suitable for making a pseudo-access at desired timing. To produce desired simultaneity (n), for example, a pseudo-access is made when simultaneity reaches to (n−1).

Figure 3:
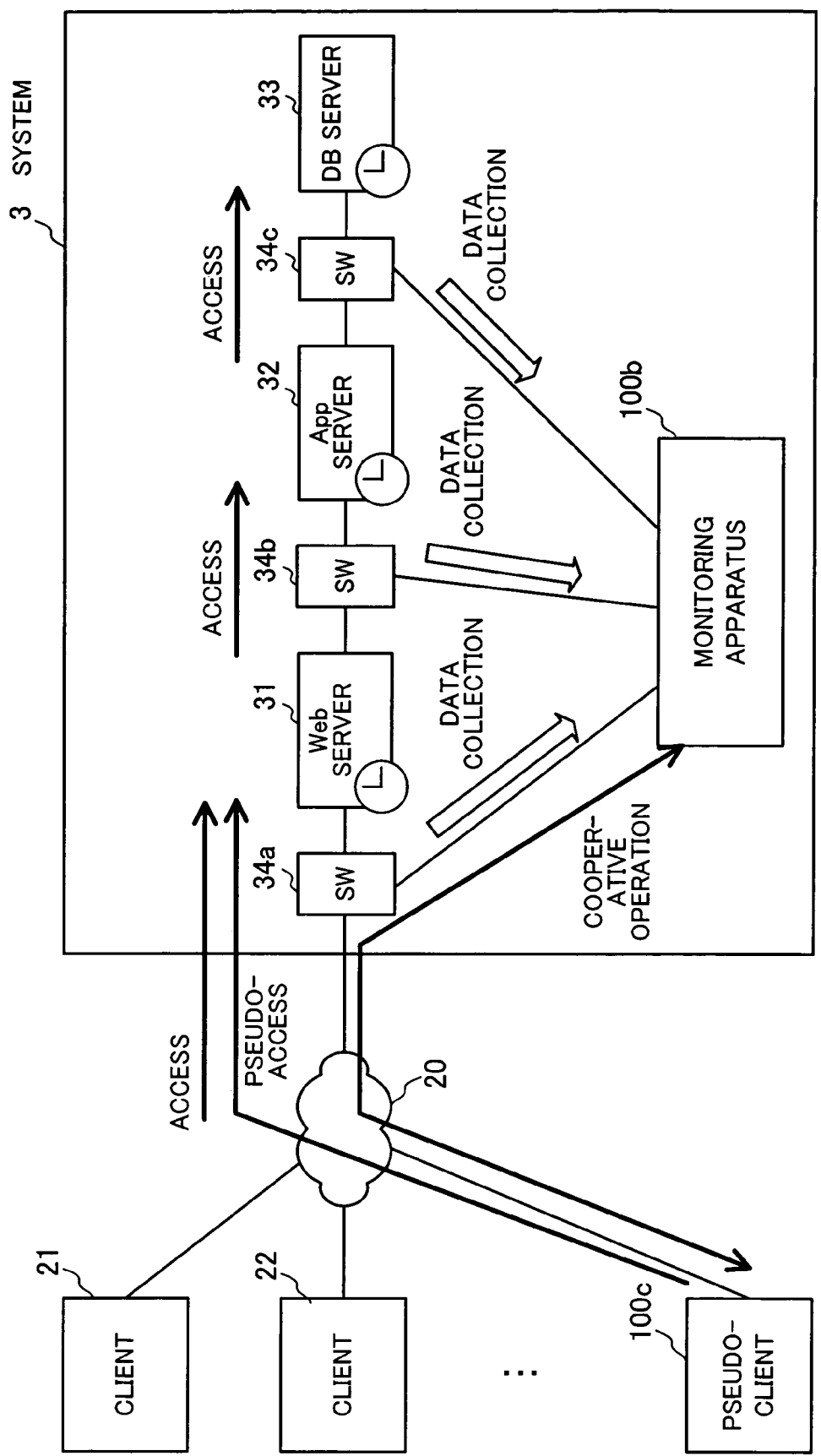
FIG. 3 shows the second configuration of the system performance monitoring apparatus.

The second configuration example of the system performance monitoring apparatus according to this embodiment will be described with reference to FIG. 3. This configuration is that an access unit is externally provided. The same reference numerals are applied to parts corresponding to those of FIG. 2 and the same functions will not be described.

A monitoring apparatus 100b is arranged inside the system 3 and is designed to be capable of collecting status information created by agents installed in the Web server 31, the App server 32 and the DB server 33, and monitoring a service level. This monitoring apparatus 100b is connected to a pseudo-client 100c over an external network 20 and operates in cooperation with the pseudo-client 100c by sending instructions to the client 100c. Each agent is a program to analyze the operating status of the own server and create a report, and monitor prescribed data items periodically or constantly. The prescribed data items include CPU utilization, access simultaneity, and information on each access. The information on each access may be a set of access simultaneity at certain timing, and the type, time, data size, and response time of the first access after this timing.

The pseudo-client 100c has an access unit to make an appropriate access in response to an access request from the monitoring apparatus 100b.

The monitoring apparatus 100b collects status information created by the agents installed in the Web server 31, the App server 32, and the DB server 33. When other status information is necessary and the status information can be created by means of an access of the access unit, the monitoring unit 100b instructs the pseudo-client 100c to make the access. Upon reception of the instruction, the pseudo-client 100c makes the pseudo-access by sending information data requesting a prescribed service to the Web server 31, the App server 32, and the DB server 33 over the external network 20. Pseudo-accesses requesting the prescribed services are equivalent to requests from the other clients 21 and 22 and are processed in the same way. The agents monitor processing of the access and create status information. The monitoring apparatus 100b collects the status information from the agents as the necessary status information.

In this configuration in which the access unit is externally provided, the pseudo-client 100c has equivalent processing functions to the clients 21 and 22. For example, the pseudo-client 100c can measure response time from issuance of a request to reception of a response.

As described above, this embodiment can be applied to the both configurations in which the pseudo-client (access unit) is provided inside or outside of the monitoring apparatus. The arrangement of the pseudo-client can be determined depending on performance of a monitoring target system and a system configuration. In addition, data traveling between servers can be collected by packet capturing via the mirror ports or from the agents installed in the servers. Alternatively, a probe may be included in server software, such as hypertext Transfer Protocol Daemon (HTTPD), for measurement. These techniques may be combined.

Both configurations where the pseudo-client/monitoring apparatus 100a is provided and where the monitoring apparatus 100b and the pseudo-client 100c are separately provided have equivalent processing functions. Therefore, irrespective of these configurations, a monitoring apparatus 100 will be hereinafter used for simple explanation.

Figure 4:
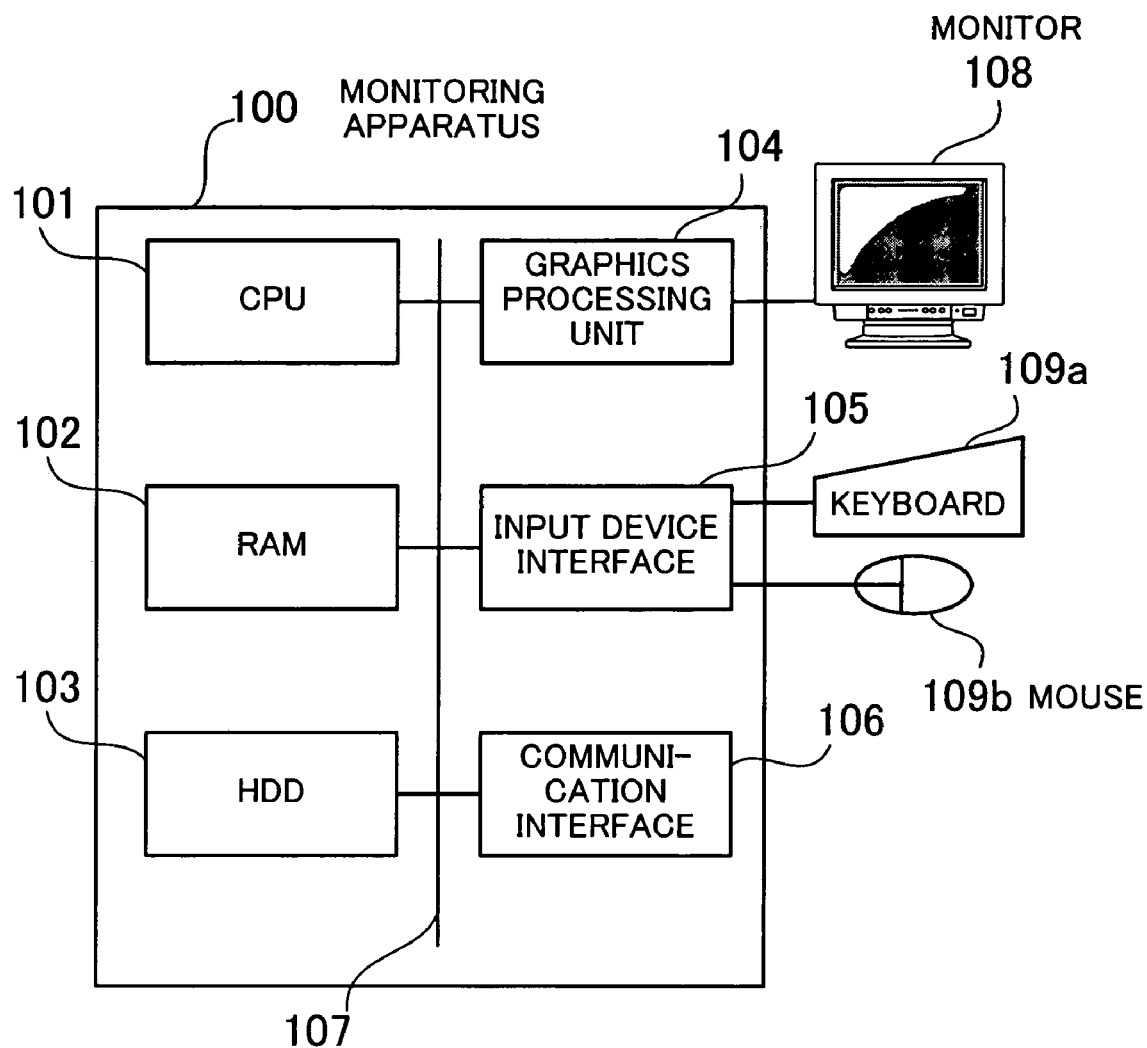
FIG. 4 is a block diagram of the hardware configuration of a monitoring apparatus.

The hardware configuration of the monitoring apparatus will be now described with reference to FIG. 4.

The monitoring apparatus 100 is entirely controlled by a CPU 101. Connected to the CPU 101 via a bus 107 are a Random Access Memory (RAM) 102, a Hard Disk Drive (HDD) 103, a graphics processing unit 104, an input device interface 105, and a communication interface 106.

The RAM 102 temporarily stores at least part of an Operating System (OS) program and application programs to be executed by the CPU 101. The RAM 102 stores various data necessary for CPU processing. The HDD 103 stores the OS and application programs. A monitor 108 is connected to the graphics processing unit 104 to display images on the monitor 108 under the control of the CPU 101. The input device interface 105 is connected to a keyboard 109a and a mouse 109b to transfer signals from the keyboard 109a and the mouse 109b to the CPU 101 through the bus 107. The communication interface 106 is connected to a network to collect data from monitoring target servers via the switches 34a, 34b, and 34c.

With such hardware configuration, the processing functions of this embodiment can be realized. Servers and clients including a pseudo-client may have the same hardware configuration shown in FIG. 4.

Figure 5:
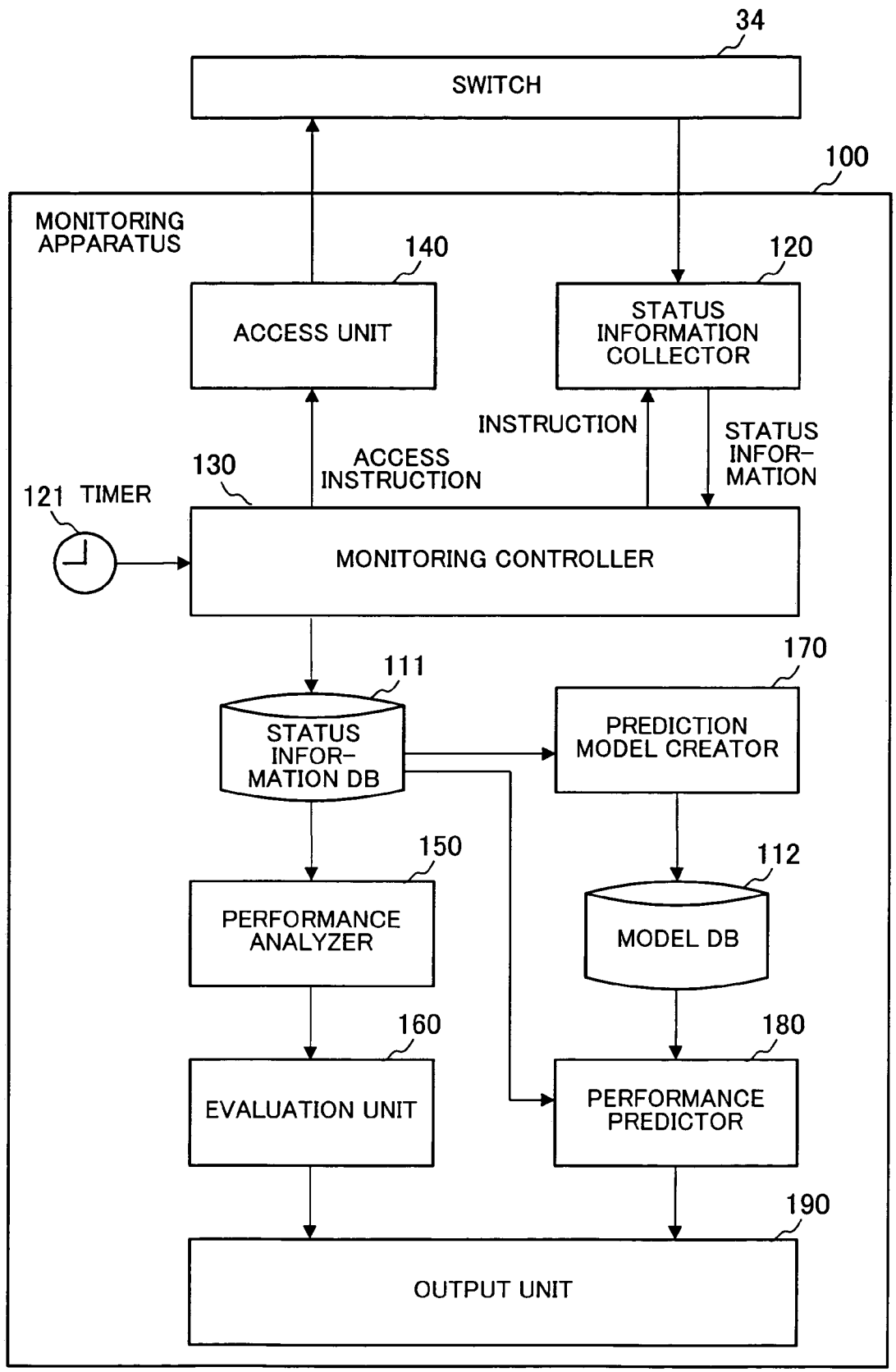
FIG. 5 is a functional block diagram of the monitoring apparatus.

FIG. 5 is a functional block diagram of the monitoring apparatus according to this embodiment.

The monitoring apparatus 100 of this embodiment has processing units including a memory storing a status information DB 111 and a model DB 112, a status information collector 120, a monitoring controller 130, an access unit 140, a performance analyzer 150, an evaluation unit 160, a prediction model creator 170, a performance predictor 180, and an output unit 190. The monitoring apparatus 100 is connected to the Web server 31, the App server 32, and the DB server 33, not shown, via the switch 34 connected to monitoring target servers.

The status information DB 111 is a database recording status information collected by the monitoring controller 130. The model DB 112 records prediction models and information including an allowable range for maintaining a service level, which are created by the prediction model creator 170.

The status information collector 120 collects packet data which comes via the mirror port of the switch 34 and is identical to data to be given to the Web server 31, the App server 32, and the DB server 33, or status information created by the agents provided in the Web server 31, the App server 32 and the DB server 33, under the control of the monitoring controller 130.

The monitoring controller 130 instructs the status information collector 120 to collect status information at prescribed intervals, according to timer information of a timer 121. The monitoring controller 130 stores all the collected status information in the status information DB 111. The status information in the status information DB 111 may be inadequate for performance evaluation or prediction model creation. If missing status information can be created by means of an access of the access unit 140, the monitoring controller 130 instructs the access unit 140 to make the access. When the monitoring target server system is accessed and the missing status information is created, the monitoring controller 130 instructs the status information collector 120 to collect the created status information. Then the monitoring controller 130 also stores the collected status information in the status information DB 111.

The performance analyzer 150 retrieves and analyzes the status information indicating the current status from the status information DB 111 to calculate the current level of specified performance. The evaluation unit 160 compares the calculated level with a criterion of this performance in order to find whether the current service level is adequate. The evaluation result is output to the output unit 190. The service level of a desired past time can be checked, if necessary.

The prediction model creator 170 retrieves from the status information DB 111 status information required for creating a prediction model, and creates the predication model based on combinations of specified performance and status information. Further, the prediction model creator 170 sets an allowable range for maintaining a service level based on the prediction model and stores it in the model DB 112 in association with the prediction model. Once stored in the model DB 112, the predication model may not be updated. The performance predictor 180 compares the status information on the current status being stored in the status information DB 111 with the allowable range to predict whether an adequate service level can be maintained. This evaluation result is output to the output unit 190.

The output unit 190 receives and displays evaluation results on a display unit. The output unit 190 may send these results to the administrator via e-mail, if required.

This monitoring apparatus 100 performs a system performance monitoring process as follows.

Collection of status information will be first described. For the collection, some techniques can be used, such as capturing of packets or collection from agents installed in servers.

In the packet capturing technique, a switch locating just before a monitoring target server makes a copy of communication of the Web server and gives it to the monitoring apparatus 100. Alternatively, a packet can be captured from the network interface of the monitoring target server. By using the captured packet, communication between a client and the server can be analyzed to create status information indicating an access type, request contents, a response code, request and response data sizes, and response time. Under HTTP protocol, the access type is a type of HTTP access (GET, POST), the request contents are an URL to be accessed, the response code is a response code (200 OK), the data size is the total of TCP payloads of the packet, the response time is time calculated by subtracting a transmission time of a request from a transmission time of a response. A technique taught in a patent application "system analysis program, system analysis method and system analysis apparatus" (Japanese Patent Application No. 2004-185909) of the inventors of this application can be used.

In this connection, a unit capturing a packet also analyzes the packet. Therefore, when a server captures a packet, the server creates status information and the monitoring apparatus 100 needs to collect the created status information.

As another technique, a probe is embedded in a server. When a request or a response is made, this information is sent to the agent of the own server or another server, or is stored in a database. By analyzing thus obtained information, status information equivalent to that created by analyzing a packet can be obtained. The status information may be sent to the monitoring apparatus 100 in response to a request or periodically.

As the other technique, an agent is provided in a monitoring target server to periodically measure CPU utilization, memory utilization and access simultaneity. The created status information is sent to an agent of a server in the system or is stored in a database, in the same way as above. The agent monitors prescribed monitoring target items periodically or constantly. Different monitoring intervals can be applied for the monitoring target items. For example, the CPU utilization and the simultaneity can be measured every minute while access information can be collected every second. The status information may be sent to the monitoring apparatus 100 in response to a request or periodically.

In the monitoring apparatus 100, the monitoring controller 130 controls collection of status information. A case of collecting status information from an agent provided in a server will be now described.

Figure 6:
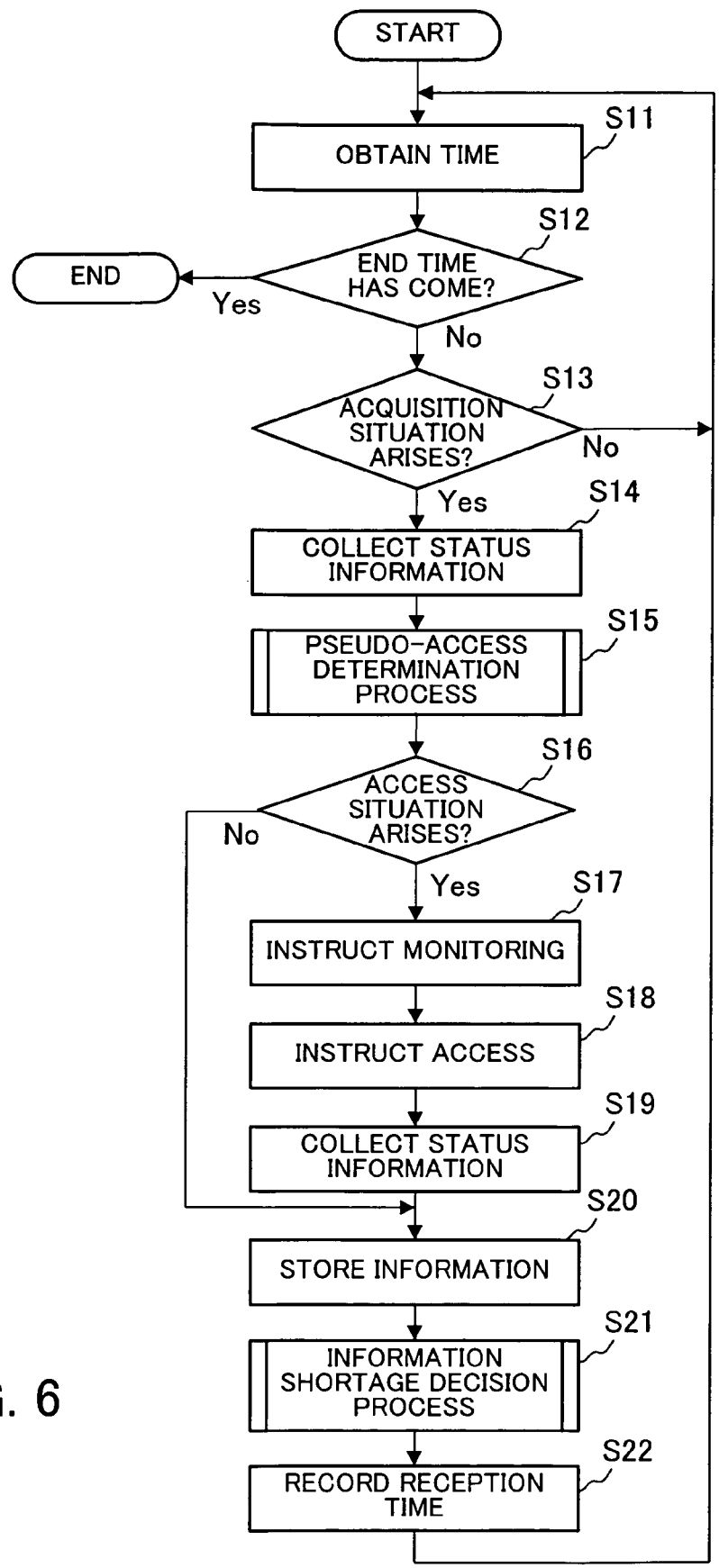
FIG. 6 is a flowchart of a status information collection process.

FIG. 6 is a flowchart of a status information collection process according to this embodiment.

At step S11, the monitoring controller 130 obtains timer information from the timer 121 and recognizes the current time.

At step S12, when an end time of monitoring is set, the monitoring controller 130 compares the current time with the end time to determine whether the end time has come. When the end time has come, this process ends. The monitoring apparatus 100 may monitor system performance only when necessary, for example, when access concentration occurs. When the number of accesses is few, the monitoring is not required. Therefore, an end time of monitoring can be previously set so as to stop monitoring.

At step S13, at the time of monitoring, the monitoring controller 130 determines whether a situation for acquiring status information arises. For example, in a case of collecting status information at prescribed intervals, it is determined whether this time period has expired. Alternatively, the monitoring may be started when a prescribed event happens. When the situation does not arise, the process goes back to step S11.

At step S14, the monitoring controller 130 instructs the status information collector 120 to collect status information. The status information collector 120 collects status information from all agents.

At step S15, a pseudo-access determination process is performed to analyze the status information and determine whether a pseudo-access is necessary to obtain other status information. This process will be described in detail later.

At step S16, the monitoring controller 130 determines whether a situation requiring a pseudo-access arises. A case where no more status information is required and a case where necessary status information may not be created by means of a pseudo-access do not require a pseudo-access, and in these cases, this process goes to step S20.

At step S17, since the situation requiring a pseudo-access arises, the monitoring controller 130 uses the status information collector 120 to instruct each agent to create status information.

At step S18, the monitoring controller 130 instructs the access unit 140 to make an access.

At step S19, the monitoring controller 130 instructs the status information collector 120 to collect status information, and the status information collector 120 collects the status information from all agents.

At step S20, the monitoring collector 120 stores the collected status information in the status information DB 111. Even data having same parameters are all stored.

At step S21, an information shortage detection process is performed to detect whether other status information is necessary. This process will be described in detail later.

At step S22, the monitoring controller 130 records reception time of status information. Then this process goes back to step S11 where the monitoring controller 130 waits for next monitoring.

With this process, status information required for performance evaluation and model creation is collected and stored in the status information DB 111.

Figure 7:
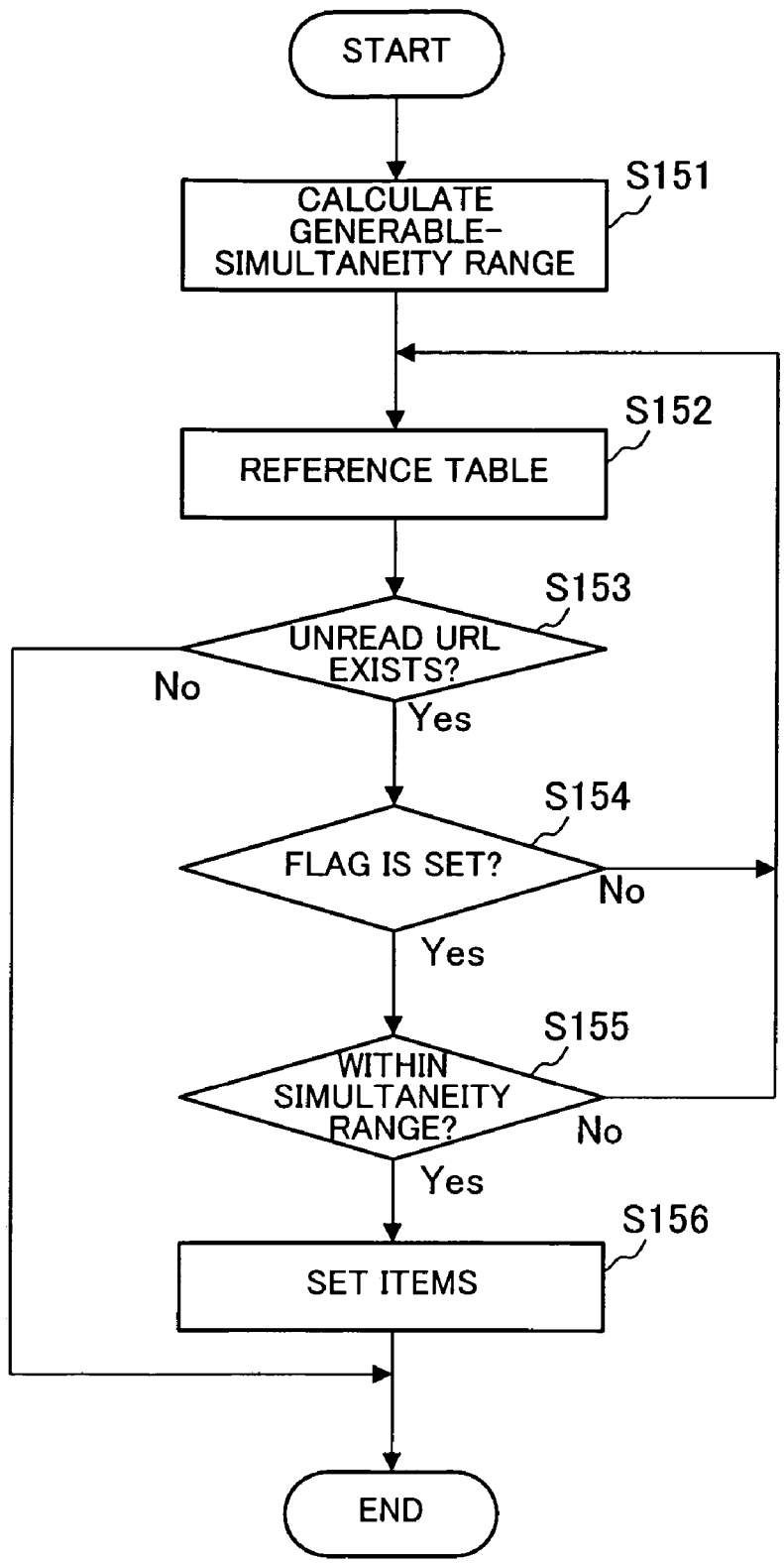
FIG. 7 is a flowchart of a pseudo-access determination process.

The pseudo-access determination process (step S15) will be described with reference to a flowchart of FIG. 7.

At step S151, a current generable-simultaneity range is calculated based on recent status information. Assume now that simultaneity (n−1) is detected and the access unit 140 can make one access. In this case, the generable-simultaneity is (n) and (n−1). Alternatively, a range of a given value m from simultaneity (n) (that is, a range from (n−m) to (n+m)) may be taken as the generable-simultaneity range. In addition, based on past access simultaneity in the status information DB 111, a range from (n) to (n+m) may be taken as the generable-simultaneity range when the number of recent accesses gradually increases while a range from (n−m) to (n) may be taken as the generable-simultaneity range when the number of recent accesses gradually decreases.

At step S152, the monitoring controller 130 references an appropriate table, such as access information, in the status information DB 111.

At step S153, the reference table is searched for an unread URL, that is, a URL that has not been checked for necessity of a pseudo-access. When there is no such URL, meaning that all URLs have been checked, this process ends.

At step S154, it is determined whether an information shortage flag was set to the detected unread URL in the information shortage detection process (step S21). When such a flag is not set, this process goes back to step S152 to check a next URL.

At step S155, it is determined whether simultaneity required for this URL is within the generable-simultaneity range calculated at step S151. If status information to be created under a desired simultaneity condition is necessary, the desired simultaneity should be within the current generable-simultaneity range. If the desired simultaneity is beyond the current generable-simultaneity range, the desired simultaneity cannot be generated even by making a pseudo-access. In this case, this process goes back to step S152 to check a next URL. When there is no desired simultaneity, the generable-simultaneity range may not be considered.

At step S156, items for making a pseudo-access to be made are set and this process ends. This is because other status information is necessary, the desired simultaneity is within the generable-simultaneity range, and conditions for creating the status information can be produced by a pseudo-access.

With this process, when a situation for making a pseudo-access arises, items for the pseudo-access are set and then a next process starts.

Figure 8:
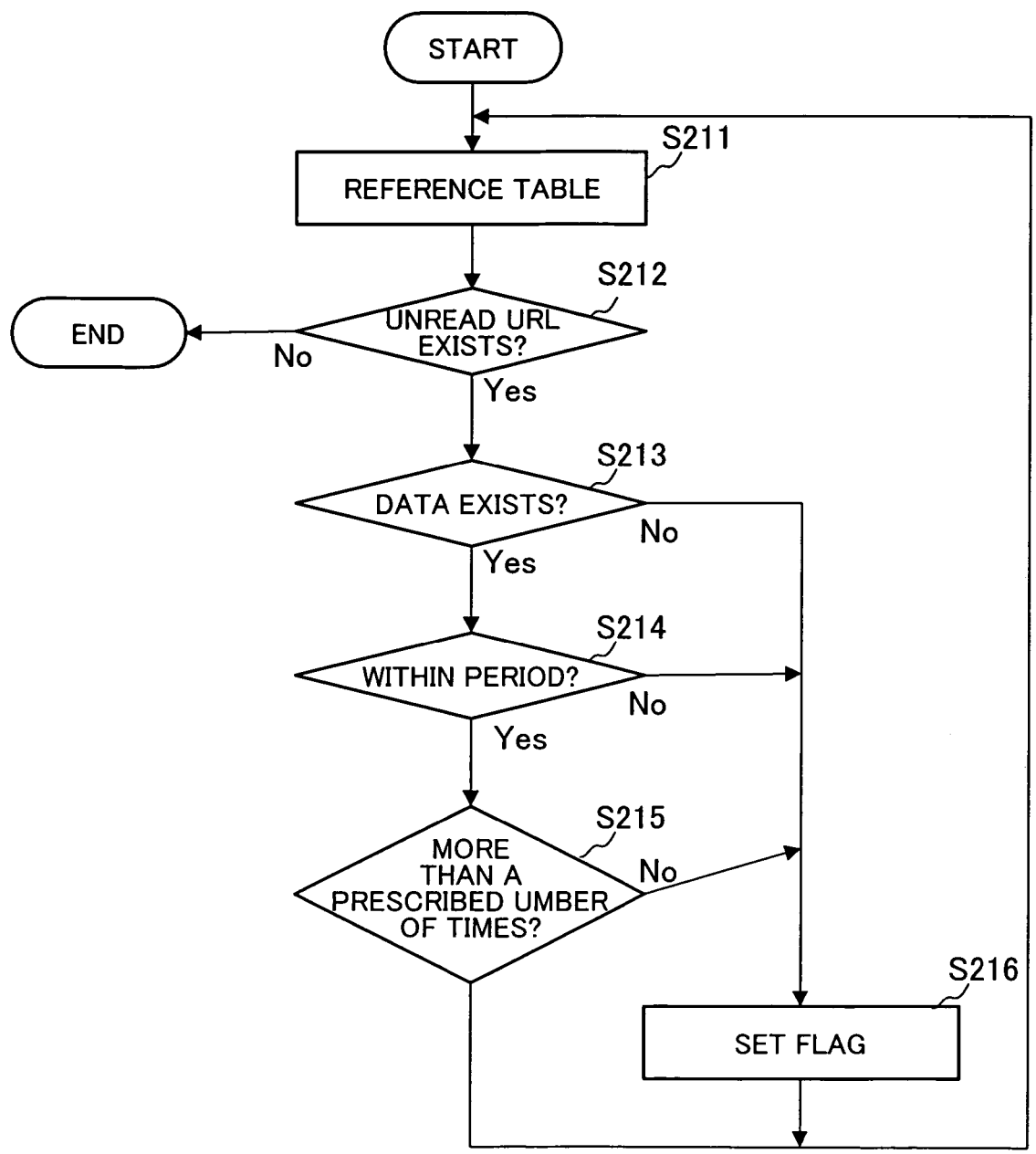
FIG. 8 is a flowchart of an information shortage detection process.

The information shortage detection process (step S21) will be now described in detail with reference to a flowchart of FIG. 8.

At step S211, the monitoring controller 130 references an appropriate table, such as access information, in the status information DB 111.

At step S212, the referenced table is searched for an unread URL, or a URL that has not been checked for information shortage. When there is no such URL, meaning that all URLs have been checked, this process ends.

At Step S213, it is determined whether status information (data) required for this URL exists. When there is no data, the process goes on to step S216.

At step S214, it is determined whether the detected status information (data) was captured within a preset time period. For example, the last monitoring time of this URL set in the table (the time of obtaining latest status information) is compared with the current time to check whether the time difference is over a threshold value. Thereby, it can be recognized whether the data is within the preset time period. When the data is over the preset time period, this process goes on to step S216.

At step S215, the number of monitoring times is counted to determine whether the URL was monitored a prescribed number of times. For example, the number of monitoring times obtained from the table for this URL is compared with an average number of monitoring times. When the number of monitoring times is less than the average, it can be recognized that other monitoring information is necessary. When the URL was monitored more than the prescribed number of times, the number of the status information (data) on this URL is determined as being enough, and in this case, an information shortage flag is not set and this process returns back to step S211 to check a next URL.

At step S216, an information shortage flag is set and this process returns back to step S211 to check a next URL.

With the above process, collected status information and the status information DB 111 are searched to determine whether the number of the existing status information is enough to evaluate performance or create a prediction model. When other status information is necessary, an information shortage flag is set. As criteria for this check, no data, a few number of monitoring times, and validity of information (passage of a preset time period from the last monitoring) are used as examples. Another criterion can be used depending on a monitoring target system.

With the above process, desired data can be dynamically obtained according to results of internal monitoring and it is determined whether an adequate service level can be maintained at a certain time.

It should be noted that the monitoring controller 130 is capable of monitoring performance without making pseudo-accesses. For example, the monitoring controller 130 passively monitors performance without making pseudo-accesses for one hour after starting-up, for data storage. When one hour passes, the monitoring controller 130 starts monitoring with pseudo-accesses. Alternatively, when data having the same pattern continue to be obtained for ten minutes or longer, the monitoring with pseudo-accesses may be started.

A pseudo-access (loads) is made not only for sending a packet requesting a service to be monitored but also for producing a desired simultaneity condition. If response time of index.htm should be measured under a simultaneity condition n, the access unit 140 makes one access to index.htm when simultaneity n−1 is detected, and then monitoring is performed. At this time, a flag can be attached to the data to indicate a pseudo-access made by the access unit 140. If one pseudo-access is not enough for monitoring, when simultaneity falls into a threshold range in which average simultaneity during a measurement period is previously determined as n−1, multiple accesses are continuously made some times, and the monitoring may be finished when monitoring is performed successfully.

FIG. 9 shows access information collected in the status information collection process according to this embodiment.

The access information 301 records information on accesses obtained by analyzing packets. In this figure, start time, request contents (URL), response time, request data size, and response data size are recorded.

FIG. 10 shows CPU utilization information collected in the status information collection process according to this embodiment.

The CPU utilization information 302 shows CPU performance detected by an agent. In this figure, passage time, average CPU utilization during the passage time, the number of requests processed, the number of processes for each service (index.html, menu.jsp, login.jsp, news.jsp) are recorded.

When these access information 301 and CPU utilization information 302 are collected, the performance analyzer 150 analyzes the information to measure performance and the evaluation unit 160 determines whether the performance meets required criteria.

A case of evaluating performance by monitoring response time will be now described.

The performance analyzer 150 analyzes access information, classifies entries by services (URL), and creates response information.

FIG. 11 shows response information created in the performance measurement process according to this embodiment.

The response information 303 is performance information on response time obtained by analyzing the access information 301 and the CPU utilization information 302 by the performance analyzer 150.

The performance analyzer 150 classifies the entries of the access information 301 by services (URL) and creates a table showing start time, response time, data size (request, response) for each URL.

The number of monitoring times is obtained by calculating how many pieces of status information are contained in the access information 301. The last monitoring time is a start time of the last entry out of the entries recorded in the access information 301. The number of monitoring times and the last monitoring time are used in the above-described information shortage detection process.

The simultaneity is calculated based on the CPU utilization information 302 and combinations of start time and response time of the entries recorded in the access information 301.

The evaluation unit 160 compares response information on each access analyzed by the performance analyzer 150 with a predetermined limit for the access, in order to determine whether a service level is adequate. Assume now that a limit of response time for index.html is 3000 ms. When response time of 3000 ms or longer is detected from collected status information, a service level is determined as being inadequate. The response information 303 of FIG. 11 shows response time of 3 ms and 2 ms for index.html. This means that the service level is adequate. The output unit 190 displays this result on a display screen so as to inform the administrator.

When the service level is determined as being inadequate, this matter may be sent to the administrator via e-mail, as well as being displayed on the display screen.

With the above processes as described above, necessary status information can be obtained at desired timing, and compared with a limit to determine whether a service level is adequate. When other status information is necessary, appropriate information data can be sent to a monitoring target server at proper timing, thereby creating the status information under desired conditions.

With the above processes, it can be confirmed whether the current server system has an adequate service level. By collecting status information everyday, a predication model representing performance at peak hours, for example, can be created and it can be predicted whether an adequate service level can be maintained under prescribed conditions.

A performance prediction process to predict whether an adequate service level can be maintained under prescribed conditions, such as at peak hours, will be now described by using a case of predicting whether response time is short enough when the number of requests, or simultaneity increases.

The prediction model creator 170 sequentially reads response information falling within a range for creating a model, creates a table showing combinations of the number of accesses and response time, and creates a function of the response time and the access simultaneity based on the table. The model creation range is desirably set, such as everyday or every week.

Figure 12:
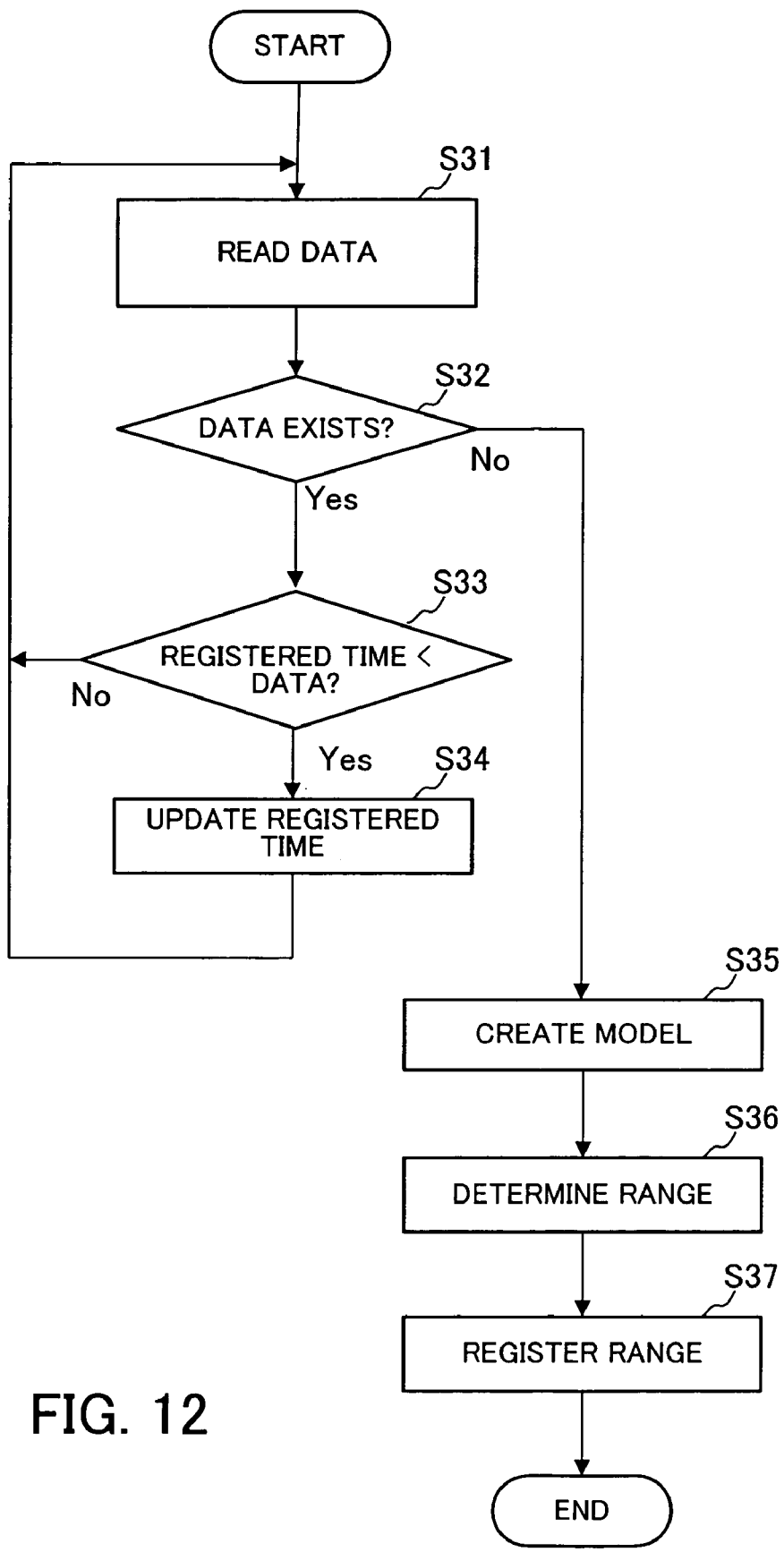
FIG. 12 is a flowchart of a prediction model creation process.

FIG. 12 is a flowchart of the prediction model creation process according to this embodiment. After a memory region for storing response information falling within the model creation range is specified in the status information DB, this process starts.

At step S31, one piece of response information (data) within the model creation range is read.

At step S32, it is determined whether data was read at step S31. When no data was found and read, it is recognized that all data have been read, and then this process goes on to step S35.

At step S33, from the read data, the longest response time under the same simultaneity condition is detected and compared with the longest response time registered in the table showing the combinations of response time and the number of accesses. When the detected time is shorter than the registered time, this process goes back to step S31 to repeat this process from reading of data.

At step S34, since the detected longest response time is longer than the registered longest response time, the registered time is updated to the detected time, and then this process goes back to step S31 to repeat this process from reading of data.

By repeating the above process, the table can be created from the all data falling within the model creation range, the table showing combinations of the number of accesses and the longest response time required under the access simultaneity condition.

At step S35, a model is created from the combinations of the number of accesses and the longest response time required under the access simultaneity condition. For example, a function of simultaneity and response time is created from the combinations with the last-square method. At this time, the response time is represented as a direct function or an exponential function of simultaneity, which is taken to as a response time model.

At step S36, an allowable simultaneity range for maintaining an adequate service level is determined by applying the prescribed limit of response time to the response time model created at step S35.

At step S37, data that has been created so far, including the response time model and the allowable simultaneity range for maintaining an adequate service level, are stored in the model DB 112.

Figure 13:
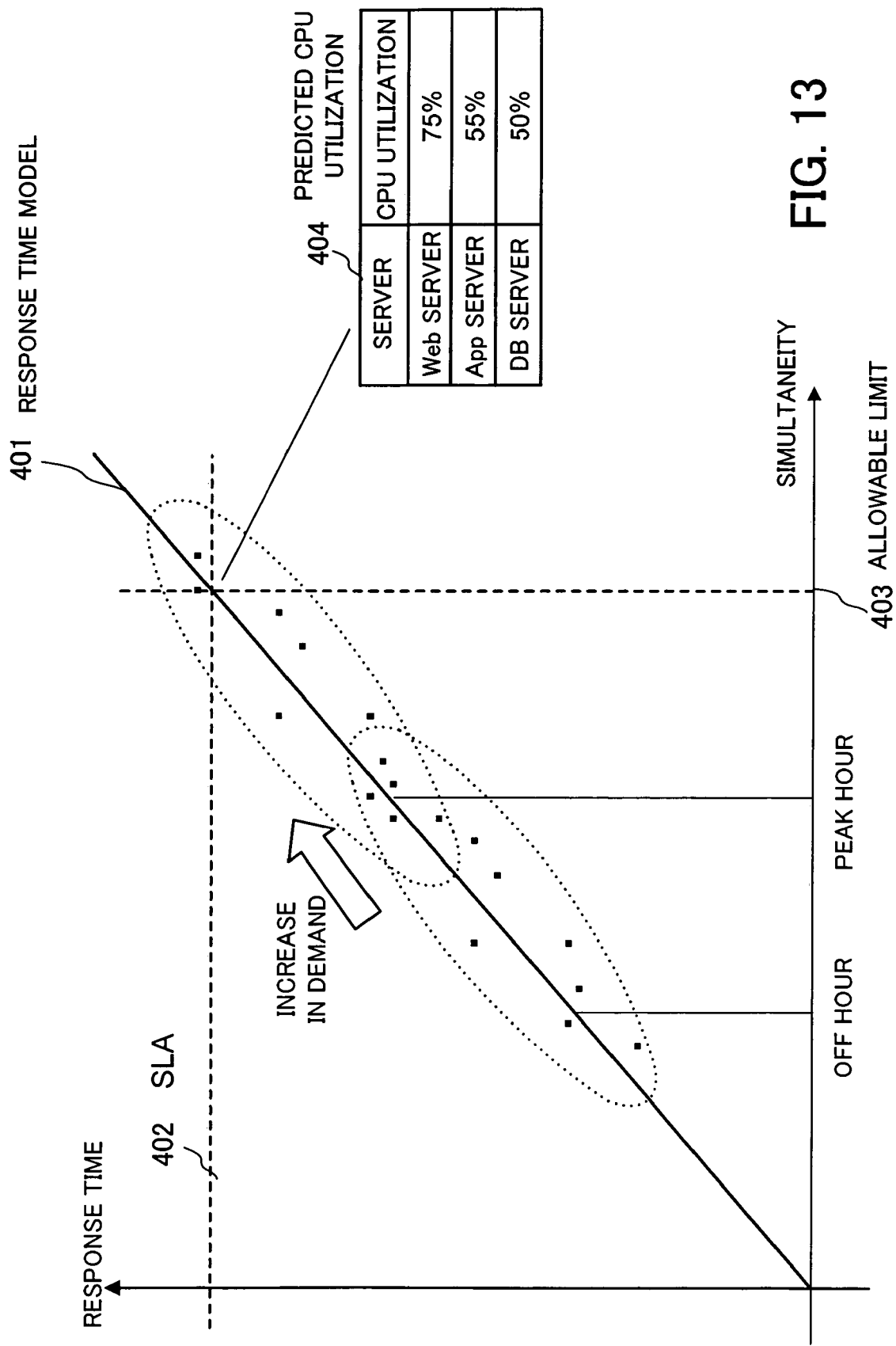
FIG. 13 shows an example of a service level predication model.

FIG. 13 shows an example of a service level prediction model according to this embodiment.

This figure shows the response time model 401 created by representing response time as the direct function of simultaneity, with the response time on a vertical axis and the simultaneity on a horizontal axis.

The response time model 401 shows that the response time increases with an increase in demand and simultaneity. Based on this response time model 401, a simultaneity limit 403 corresponding to an SLA 402 indicating a limit of response time for maintaining an adequate service level is determined.

The prediction model creator 170 creates a prediction model based on data for past one-day that is a model creation range, at a predetermined time everyday, and this prediction model can be used for predicting a service level for one day. Alternatively, all stored data are used to create the prediction model. Not only a time period but also a day of the week can be set as the model creation range.

By using CPU utilization instead of simultaneity, a CPU utilization prediction 404 can be created, which enables performance prediction based on the CPU utilization.

The performance predictor 180 predicts a service level prediction process by using thus created response time model. This prediction process determines a probability of causing an inadequate service level, based on whether the recent simultaneity obtained from status information exceeds a limit of an allowable simultaneity range for maintaining an adequate service level. When the detected simultaneity is close to the limit, for example, when the simultaneity reaches in a upper 10% of the allowable simultaneity range, it may be determined that the service level may become inadequate soon.

Figure 14:
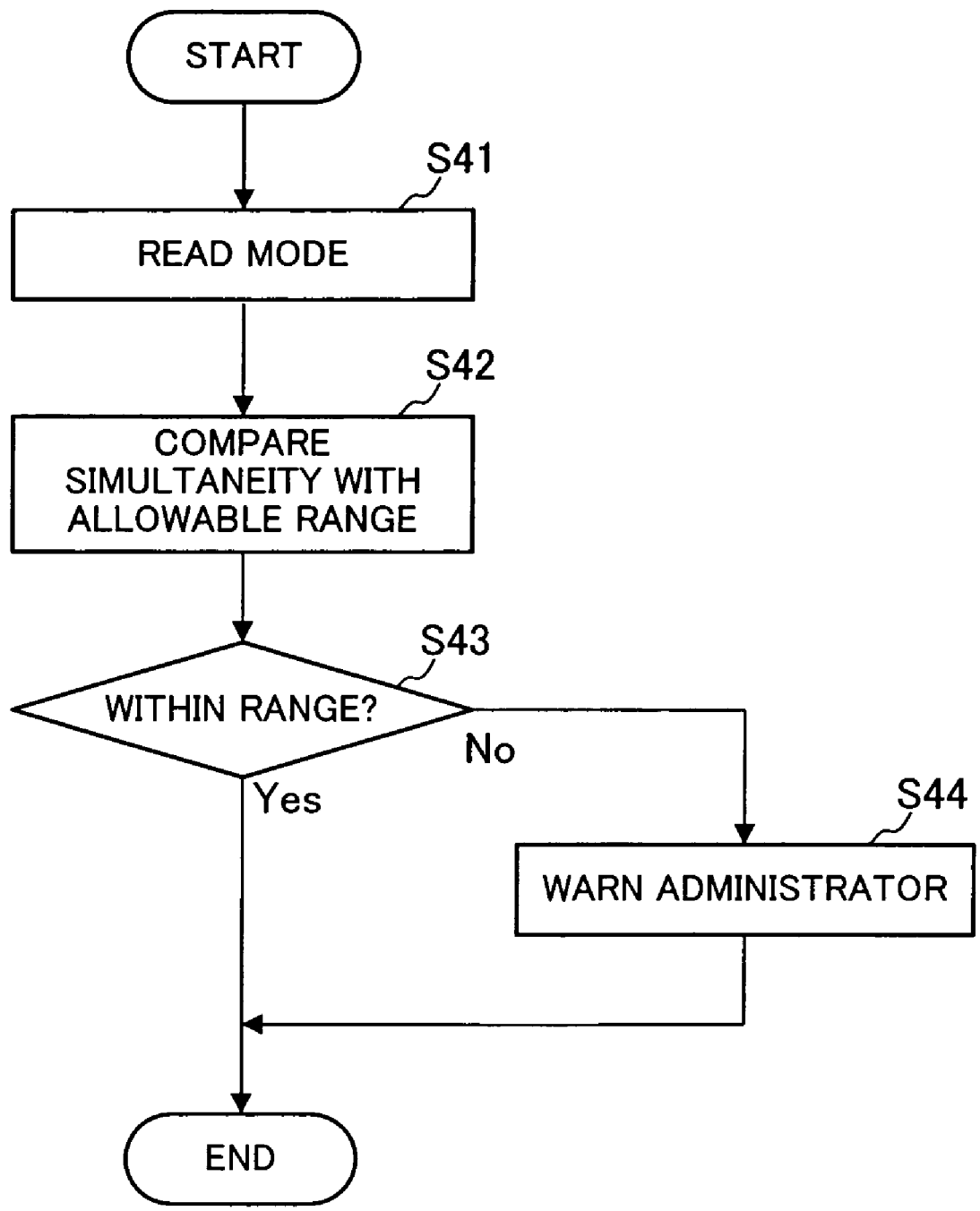
FIG. 14 is a flowchart of a service level predication process.
Figure 15:
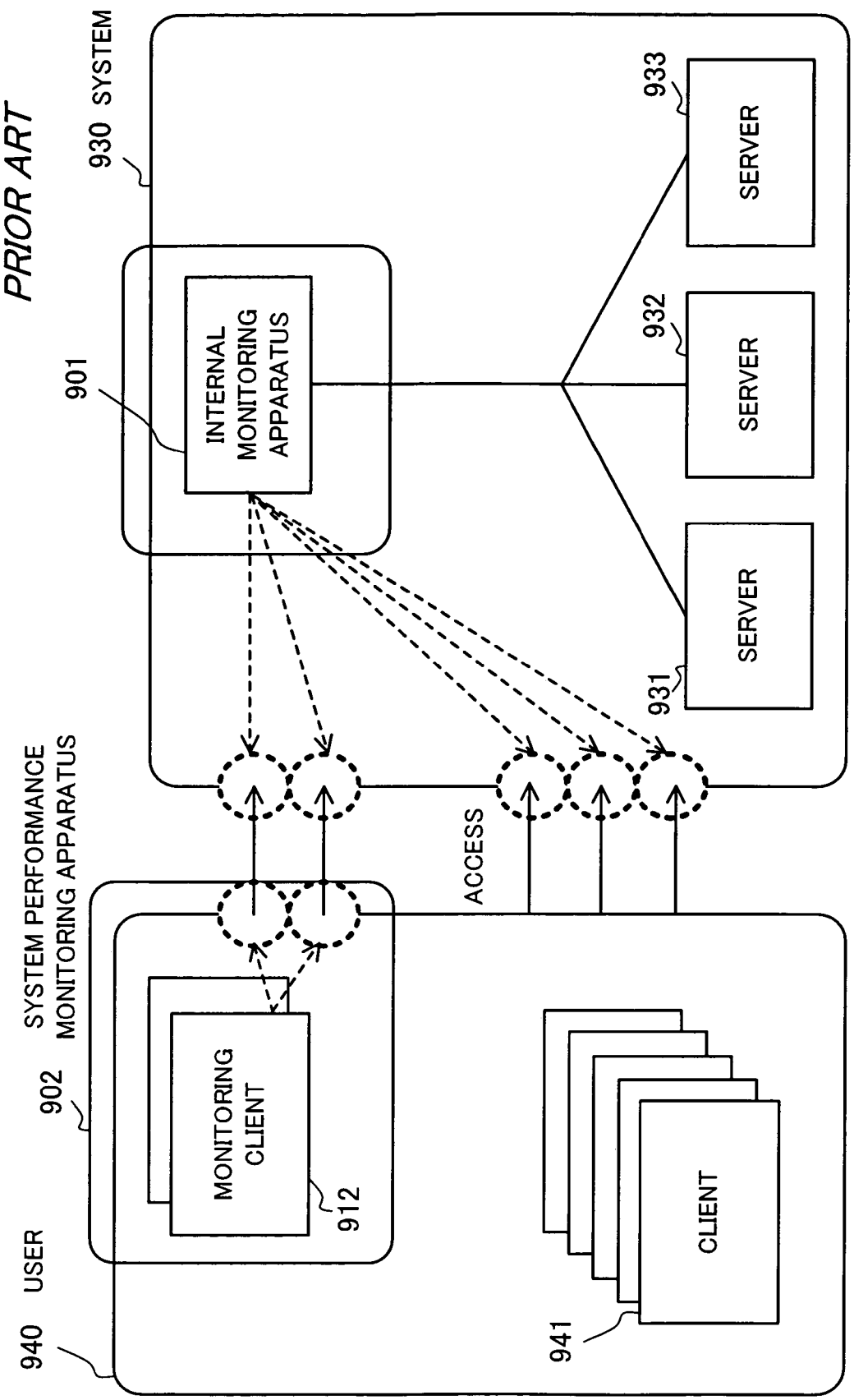
FIG. 15 shows an example of a typical system performance monitoring apparatus in related art.

FIG. 14 is a flowchart of the service level prediction process according to this embodiment.

At step S41, the performance predictor 180 reads a response time model and an allowable range for maintaining a service level, from the model DB 112. For early warning, 90% of the allowable range can be set as a limit of the allowable range.

At step S42, to evaluate performance at a prescribed time, for example, at the most recent time or at a rush hour, the simultaneity of the time is detected and is compared with the allowable range read at step S41.

At step S43, it is determined whether the simultaneity of the time is within the allowable range. When this determination is YES, this process ends.

At step S44, since the simultaneity of the time is beyond the allowable range, a warning is issued to the administrator, to tell that "service level may be inadequate" or "service level may become inadequate", and this process ends.

With the above process, it can be predicted whether an adequate service level can be maintained.

When it can be recognized that the service level may be inadequate, the access unit 140 can make a pseudo-access to confirm an actual service level.

The processing functions described above can be realized by a computer. In this case, a program is prepared, which describes processes for performing the functions of the system performance monitoring apparatus. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include hard disk drives (HDD), flexible disks (FD), magnetic tapes, etc. The optical discs include digital versatile discs (DVD), DVD-Random Access Memories (DVD-RAM), compact disc read-only memories (CD-ROM), CD-R (Recordable)/RW (ReWritable), etc. The magneto-optical recording media include magneto-optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

According to this invention, when other status information is necessary for evaluating performance, an appropriate access for creating the status information is made at proper timing to produce desired conditions (desired simultaneity and access pattern), and the desired status information is obtained. This means that status information can be created at desired timing and under the desired conditions, so that it can be checked based on the collected status information whether the level of a monitoring target service can be maintained.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium recording a system performance monitoring program for monitoring performance of a server system having a plurality of servers connected to each other over a network to provide prescribed services, the program causing a computer to function as:

monitoring means for acquiring and storing status information indicating an operating status of the server system in status information memory means, and when other status information is necessary for performance evaluation, issuing an access instruction to make an appropriate access for producing monitoring conditions for creating the other status information in the server system, and acquiring and storing the other status information created by means of the appropriate access in the status information memory means;

access means for receiving the access instruction from the monitoring means and making the appropriate access to the server system over the network in order to produce the monitoring conditions in the server system;

evaluation means for analyzing the status information and the other status information being stored in the status information memory means to measure performance and evaluating whether the server system meets a prescribed performance criterion; and performance prediction means for analyzing the status information and the other status information to detect combinations of specified performance as a performance parameter and a specified data item contained in the status information and the other status information, calculating an allowable range of the specified data item for maintaining the prescribed performance criterion based on the combinations, and predicting whether the server system can maintain the prescribed performance criterion, by comparing a current value of the specified data item detected from the status information and the other status information with the allowable range, the status information and the other status information being stored in the status information memory means.

2. The computer-readable recording medium according to claim 1, wherein the monitoring means collects the status information and the other status information created by agents installed in the plurality of servers, the status information and the other status information indicating internal statuses of the plurality of servers, the internal statuses including CPU utilization and simultaneity of accesses.

3. The computer-readable recording medium according to claim 1, wherein the monitoring means acquires information data traveling between the plurality of servers, via mirror ports of switches, and analyzes the information data to create the status information and the other status information, the switches provided in the network connecting the plurality of servers, the status information and the other status information indicating a destination address of the information data, a service type, and response time.

4. The computer-readable recording medium according to claim 1, wherein the monitoring means issues to the access means the access instruction specifying an access pattern and timing of the appropriate access for producing the monitoring conditions for creating the other status information in the server system.

5. The computer-readable recording medium according to claim 4, wherein when the other status information required for the performance evaluation should be created under desired simultaneity of accesses that are processed in the server system, the monitoring means measures current simultaneity based on the status information and issues the access instruction to cover only deficient accesses for the desired simultaneity.

6. The computer-readable recording medium according to claim 1, wherein the monitoring means firstly collects the status information, during a preset period of time or when a prescribed situation arises.

7. The computer-readable recording medium according to claim 1, wherein the performance prediction means analyzes the status information and the other status information to detect the combinations of the performance parameter and the specified data item, creates as a prediction model a function of the performance parameter and the specified data item based on the combinations, and calculates the allowable range of the specified data item for maintaining the prescribed performance criterion by using the prediction model, the status information and the other status information being stored in the status information memory means.

8. The computer-readable recording medium according to claim 7, wherein the performance prediction means reads appropriate status information meeting prescribed conditions including a prescribed period of time, from the status information memory means, and uses the appropriate status information read to create the prediction model.

9. The computer-readable recording medium according to claim 7, wherein the performance prediction means determines the allowable range of the specified data item by applying a limit of the prescribed performance criterion to the prediction model, and determines that the server system may not maintain the prescribed performance criterion if a value of the specified data item detected from the status information and the other status information collected by the monitoring means is beyond the allowable range of the specified data item.

10. The computer-readable recording medium according to claim 7, wherein the performance prediction means narrows by a margin the allowable range of the specified data item determined by applying a limit of the prescribed performance criterion to the prediction model, and determines early that the server system may not maintain the prescribed performance criterion if a value of the specified data item detected from the status information and the other status information collected by the monitoring means is beyond the allowable range narrowed.

11. A system performance monitoring method for monitoring performance of a server system having a plurality of servers connected to each other over a network to provided prescribed services, wherein:

monitoring means acquires and stores status information on an operating status of the server system in status information memory means, and when other status information is necessary for performance evaluation, issues an access instruction to make an appropriate access for producing monitoring conditions for creating the other status information in the server system;

access means receives the access instruction from the monitoring means and makes the appropriate access to the server system over the network in order to produce the monitoring conditions in the server system;

the monitoring means acquires and stores the other status information created by means of the appropriate access, in the status information memory means;

evaluation means analyzes the status information and the other status information being stored in the status information memory means to measure performance and evaluating whether the server system meets a prescribed performance criterion; and performance prediction means for analyzing the status information and the other status information to detect combinations of specified performance as a performance parameter and a specified data item contained in the status information and the other status information, calculating an allowable range of the specified data item for maintaining the prescribed performance criterion based on the combinations, and predicting whether the server system can maintain the prescribed performance criterion, by comparing a current value of the specified data item detected from the status information and the other status information with the allowable range, the status information and the other status information being stored in the status information memory means.

12. A system performance monitoring apparatus for monitoring performance of a server system having a plurality of servers connected to each other over a network to provide prescribed services, the system performance monitoring apparatus comprising:

monitoring means for acquiring and storing status information on an operating status of the server system in status information memory means, and when other status information is necessary for performance evaluation, issuing an access instruction to make an appropriate access for producing monitoring conditions for creating the other status information in the server system, and acquiring and storing the other status information created by means of the appropriate access in the status information memory means;

access means for receiving the access instruction from the monitoring means and making the appropriate access to the server system over the network in order to produce the monitoring conditions in the server system;

evaluation means for analyzing the status information and the other status information being stored in the status information memory means to measure performance and evaluating whether the server system meets a prescribed performance criterion; and performance prediction means for analyzing the status information and the other status information to detect combinations of specified performance as a performance parameter and a specified data item contained in the status information and the other status information, calculating an allowable range of the specified data item for maintaining the prescribed performance criterion based on the combinations, and predicting whether the server system can maintain the prescribed performance criterion, by comparing a current value of the specified data item detected from the status information and the other status information with the allowable range, the status information and the other status information being stored in the status information memory means.

* * * * *